Patented Dec. 27, 1949

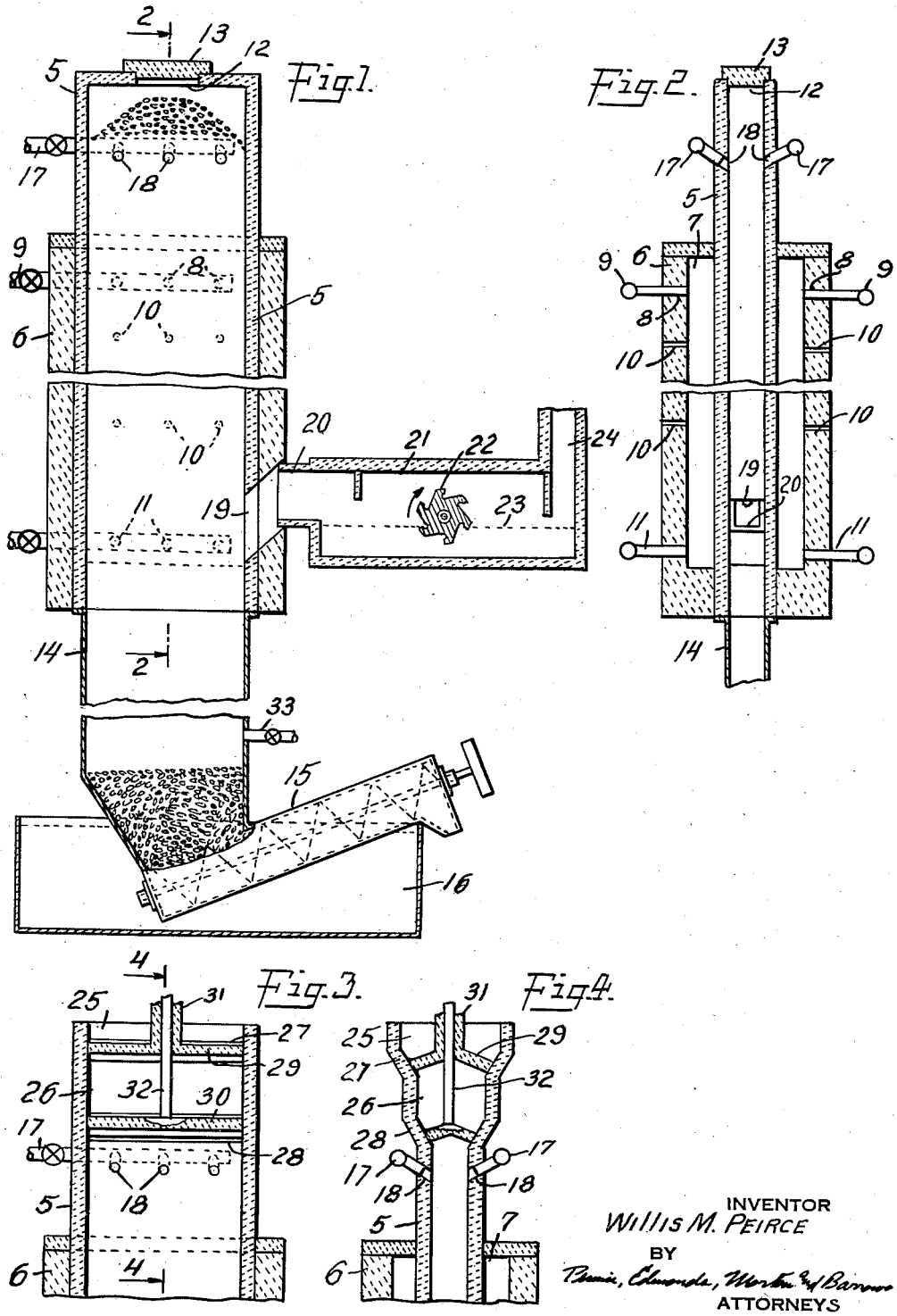

2,492,438

UNITED STATES PATENT OFFICE 2,492,438

PROCESS FOR VERTICAL RETORT SMELTING OF ZINCIFEROUS MATERIALS

Willis M. Peirce, Lehighton, Pa., assignor to The New Jersey Zinc Company, New York, N. Y., a corporation of New Jersey Application December 22, 1948, Serial No. 66,801

4 Claims. (Cl. 75—88)

This invention relates to the vertical retort smelting of zinciferous materials and contemplates improvements therein which lead to more effective smelting and zinc recovery practice.

The conventional vertical retort structure comprises a relatively long upright retort the upper portion of which is insulated but not heated, and the major portion of the remainder of the retort is enclosed in a furnace structure so as to permit external heating of this portion of the retort. The unheated upper portion of the retort is known as the charge column, and a relatively short portion of the retort depending below the furnace structure is referred to as the discharge extension. An agglomerated charge of mixed zinciferous material and carbonaceous reducing agent is introduced into the upper end of the charge column and the charge progressively passes downwardly through the retort and is removed from the bottom of the discharge extension. The heat imparted to the charge in that portion of the retort surrounded by the furnace structure promotes reduction of the zinciferous material by the carbonaceous reducing agent with the resulting production of metallic zinc vapor. The reaction between the carbonaceous reducing agent and the zinciferous material produces carbon monoxide. The resulting zinc vapor and carbon monoxide produced within the retort are withdrawn from an outlet near the top of the charge column and are passed to a zinc condenser for the recovery of the zinc in the form of molten metal. A small amount of air is generally admitted through the lower end of the discharge extension in order to provide an upward draft through this lowermost portion of the charge for the purpose of preventing diffusion of zinc vapor downwardly into the spent charge wherein it would otherwise be absorbed and lost.

The zinc vapor-bearing smelting gases have been withdrawn heretofore from the upper end of the charge column in order to transfer a portion of the sensible heat thereof to relatively cool fresh charge and for the further purpose of cooling the zinc vapors in this manner in order to facilitate their subsequent condensation. Although the zinc vapor-bearing gases are predominantly reducing in character, they further contain small amounts of carbon dioxide. The carbon dioxide present in the gases oxidizes some of the zinc vapor to produce finely divided zinc oxide which deposits progressively both in the upper portion of the charge column and in the zinc vapor outlet line in the form of massive rock oxide. The mechanical removal of this rock oxide requires interruption of the furnace operation and involves arduous hand labor. Moreover, the resulting thermal and mechanical shocks to the refractory structures which are involved in removal of this rock oxide are detrimental to the life of the retort and of its auxiliary structures.

The presence of carbon dioxide in the zinc vapor-bearing gases in a vertical retort appears to be produced by two independent reactions. The carbon monoxide rising through the charge acts itself as a reducing agent for the zinc oxide in the charge and is converted thereby to carbon dioxide. Inasmuch as this reaction takes place while the gases are moving upwardly through the charge toward the relatively cool charging end of the retort, some of the carbon dioxide thus produced does not have the opportunity to become converted back to carbon monoxide by contact with hot carbonaceous matter in the charge. The other source of carbon dioxide appears to be the reaction wherein carbon monoxide dissociates into carbon dioxide and carbon. This latter reaction takes place at temperatures somewhat below those usually prevailing in the retort gases leaving the upper end of the retort. The conventional baffle-type condensers used heretofore for condensing the zinc vapor in the retort gases have been unable to function without the production of an excessive amount of physical blue powder and zinc oxide accretions when the temperature of the zinc vapor-bearing gases entering the condenser was approximately the same as that of the gases at the time they leave the retort. Accordingly, it has been necessary heretofore to provide a passage of appreciable length between the retort and the baffle-type condenser wherein the retort gases could be cooled appreciably before they enter the condenser. The cooling effected in such a passage provides a relatively slow rate of cooling of the retort gases through the temperature range in which carbon monoxide dissociates as aforementioned with the resulting production of carbon dioxide, and the carbon dioxide thus produced has led to the formation of additional massive deposits of rock oxide in the connecting passage and in the condenser itself.

I have now found that the presence of carbon dioxide in the zinc vapor-bearing gases from a vertical retort can be virtually eliminated by withdrawing the gases from the lower portion of the retort and by condensing the zinc vapor in a splash-type condenser. I have also found that when the zinc smelting process is carried out in this manner, a relatively large amount of oxygen-bearing gas may be introduced into the upper portion of the retort so as to provide a substantial amount of internal heating within the charge without danger of fusing the charge and without impairing the effective recovery of molten zinc in the condenser.

It will thus be seen that my present invention comprises an improvement in the smelting of zinc wherein an agglomerated charge of mixed zinciferous material and carbonaceous reducing agent is progressively passed downwardly through an externally heated vertical retort wherein the charge is heated to a temperature sufficiently high to reduce compounds of zinc therein and to produce metallic zinc vapor. The improvement in accordance with the invention comprises admitting an oxygen-bearing gas into the upper portion of the retort and withdrawing zinc vapor-bearing gases from the lower portion of the retort so as to maintain a flow of the zinc vapor and retort gases concurrently with the charge downwardly through the retort, and condensing the withdrawn zinc vapors in a splash-type condenser. The oxygen-bearing gas which is introduced into the upper portion of the retort may comprise air, although it is particularly advantageous for this purpose to use air enriched with oxygen or to use oxygen alone.

These and other novel features of the invention will be more fully understood by reference to the following description taken in conjunction with the accompanying drawings in which Fig. 1 is a sectional elevation of a vertical retort and associated splash-type condenser useful in practicing the invention;

Fig. 2 is a partial sectional elevation taken along the line 2—2 in Fig. 1;

Fig. 3 is a sectional elevation of the upper portion of the vertical retort showing a particularly advantageous retort charging device for use in practicing the invention; and Fig. 4 is a sectional view taken along line 4—4 in Fig. 3.

The vertical retort shown in Figs. 1 and 2 comprises a vertically disposed elongated retort 5 having a rectangular cross section. The cross-sectional dimensions of the retort are such that the retort has the shape of a relatively wide, narrow column. Except for a relatively short portion of the retort near the top, the retort is enclosed in a furnace structure 6. The furnace structure provides a combustion chamber 7 adjacent the relatively wide sides of the retort. This furnace structure is of conventional vertical retort design and has been found to be best adapted for the transfer of heat uniformly to the descending charge within the retort. A suitable firing gas is introduced into the combustion chamber 7 through valved ports 8 connected to firing gas supply pipes 9. The outer wall of the furnace structure is provided with vertically spaced air ports 10 for supplying air for combustion of the firing gas. The products of combustion of the firing gas are withdrawn at the bottom of the combustion chamber through gas outlets 11.

The top of the retort is provided with a charge opening 12 which may be closed by a removable cap 13. A discharge extension 14 depends from and communicates with the lowermost end of the retort. Spent charge in the extension 14 may be withdrawn in any suitable fashion such, for example, as by a screw conveyor 15. The lowermost end of the discharge extension 14 and a portion of the screw conveyor 15 may be immersed in a tank of water 16 in order to cool the spent charge sufficiently to facilitate its handling and disposal.

An air supply manifold 17 is provided adjacent the uppermost end of the retort, advantageously above the furnace structure. The air manifold communicates through openings 18 with the interior of the retort. An outlet 19 for the zinc vapor-bearing retort gases is provided adjacent the lower portion of the retort. The outlet 19 is advantageously inclined upwardly and outwardly through both the retort 5 and the furnace structure 6 so as to permit withdrawal of zinc vapor-bearing gases while preventing discharge of the agglomerated charge therethrough.

The zinc vapor outlet 19 communicates directly with the inlet 20 of a splash-type condenser 21. The condenser is advantageously of the type described in Patent No. 2,457,545 to Erwin C. Handwerk, George T. Mahler and Harry C. Haupt. Such a condenser is provided with a rotor 22 mounted about a horizontal axis. The rotor dips into a body of molten zinc 23 maintained in the bottom of the condenser and hurls a shower of molten zinc upwardly into the condenser with such violence as to provide a turbulent shower of molten zinc therewithin through which the incoming zinc vapor-bearing gases are passed. Either a single rotor may be used, or two rotors operating in separate zones within the condenser may be used as described in United States Patent No. 2,457,551 to Stanley Robson. Instead of a horizontal rotor, the rotor may be mounted about a vertical axis as described in United States Patent No. 2,457,550 to George T. Mahler and Erwin C. Handwerk, or the rotor may be mounted obliquely within the condensing chamber as described in the copending application of Erwin C. Handwerk and George T. Mahler, Serial No. 57,588, filed October 30, 1948. The condenser may be provided with cooling means such as those described in United States Patents Nos. 2,457,547 and 2,457,549 to Erwin C. Handwerk and George T. Mahler. The exhaust gases substantially free from zinc vapor are removed from the condenser through the discharge line 24.

In practicing the invention in the apparatus illustrated in the drawings, preheated agglomerates of mixed zinciferous material and carbonaceous reducing agent are introduced through the charge opening 13 into the top of the retort in such manner that the smelting operation within the retort is conducted as a substantially continuous process. The agglomerates charged into the top of the retort are customarily coked to produce structures possessing adequate strength to withstand the subsequent smelting operation without substantial disintegration. In the practice of the present invention, the agglomerates leaving the coking furnace, when prepared in the manner described in United States Patent No. 1,875,249 to Erwin C. Handwerk and George T. Mahler, are advantageously transferred directly to the smelting retort 5 and will enter the retort at a temperature approximating 850° C. When the transfer of coked agglomerates to the retort is delayed for any reason, it is desirable that they be at a temperature of at least 500° C. before they are charged to the furnace in order to facilitate economic smelting conditions.

The coked agglomerates charged to the vertical retort 5 substantially completely fill the retort. The charge is heated by combustion of the firing gas within the furnace chamber 7, wherein a firing temperature of approximately 1300° C. is maintained, and is smelted with the production of metallic zinc vapor. The spent or worked-off agglomerates which pass into the discharge extension 14 are removed, preferably continuously, by means of the screw conveyor 15. As a result, the charge settles within the retort and produces a fairly regular movement of the charge downwardly therewithin.

In accordance with the present invention, an oxygen-bearing gas such as atmospheric air is admitted into the upper portion of the retort through the air inlets 18. The oxygen of the air combines with the carbon in the agglomerated charge with the attendant generation of heat. The heat thus generated within the body of the charge augments the heat transmitted to the charge from the furnace chamber 7 and aids in establishing the desired smelting temperature uniformly throughout the charge. Moreover, the fresh charge, although preheated, has the capacity to absorb a relatively large amount of sensible heat and is quickly raised to the desired smelting temperature by the relatively high concentration of oxygen in the upper portion of the charge. Accordingly, the internally generated heat not only promotes a more uniform temperature crosswise through the charge but also establishes a more uniform smelting temperature throughout the depth of the charge. The introduction of the oxygen-bearing gas into the upper portion of the retort also increases the thermal efficiency of the retort. The volume of retort gases produced within the charge augments the volume of carbon monoxide produced by the smelting reaction between the carbonaceous reducing agent and the zinciferous material. The resulting increase in the volume of retort gases promotes, by its increased rate of flow through the charge, a more effective transfer of heat from the heated walls of the retort to the body of the charge therebetween. Thus, the air introduced into the retort in appreciable amount in accordance with the invention lengthens the effective smelting zone within the retort and thereby increases the smelting capacity of a vertical retort of any given size.

The zinc vapor and retort gases produced by the smelting conditions within the charge are withdrawn through the outlet 19 and thence to the splash-type condenser 21. The zinc vapor-bearing gases introduced into the condenser 21 pass through a shower of relatively cool molten zinc therewithin. The shower of molten metal produced within a splash-type condenser such as described hereinbefore substantially completely fills the main body portion of the condenser so that all of the gases and vapors introduced into the condenser must pass through this shower before they leave the condenser. As a result, the condensable zinc vapor is removed from the retort gases to such an extent that the exhaust gases withdrawn through the condenser discharge line 24 contain substantially only that amount of zinc vapor which is in equilibrium with molten zinc at the temperature of the molten zinc prevailing within the condenser. As pointed out in the aforementioned patents relating to splash-type condenser, the temperature of the molten zinc therein may range between approximately the melting point of zinc up to about 550° C., or slightly higher.

The introduction of an oxygen-bearing gas into the upper portion of the retort charge makes possible the use of more heat-generating oxygen than can be tolerated in conventional vertical retort practice. In such conventional practice, wherein the charge and retort gases move countercurrently, the air introuded into the retort at the bottom thereof comes into contact first with substantially spent charge containing excess carbonaceous material. The spent charge, which is at a relatively high temperature and which contains very little zinc oxide the endothermic heat of reduction of which would absorb heat, has very little capacity for absorbing additional heat generated by combustion of the excess carbonaceous material in the presence of the added air. As a result, the danger of effecting fusion of the spent charge with consequent interruption of the retort operation has imposed a low limit upon the amount of air which can be introduced into the lower portion of the charge. In accordance with the present invention, on the other hand, the oxygen-bearing gas is introduced into the relatively cool zinc oxide-containing charge in the upper portion of the retort which has a high capacity for absorbing internally generated heat and substantially all of the oxygen is consumed before it descends to the lower and hotter portion of the charge. Thus, the amount of oxygen which can be introduced into the retort in accordance with my method may far exceed that amount which would cause fusion of the hot spent charge if introduced directly thereinto. This advantageous characteristic of the method of the invention makes it possible and even desirable to use oxygen-enriched air or oxygen alone in lieu of air as the oxygen-bearing gas.

The advantages in using oxygen-enriched air or oxygen alone in accordance with my invention are twofold. The relatively high concentration of inert nitrogen in air used for internal heating of the vertical retort charge materially dilutes the zinc vapor-bearing retort gases. Although the splash-type zinc condensers referred to hereinbefore are capable of condensing zinc in very dilute concentrations, more efficient metallurgical results are obtained with higher zinc vapor concentrations in the retort gases. Moreover, the inert nitrogen content of air contributes nothing to the operation of the retort and is actually detrimental in that it wastefully absorbs heat which would otherwise be available for promoting the smelting operation. Thus, by enriching the admitted air with oxygen, the sensible heat produced by combustion of the carbonaceous reducing agent may be increased without proportionately increasing the resulting dilution of the zinc vapor-bearing retort gases. By using oxygen alone in lieu of air, maximum internal heating is obtained with minimum dilution of the retort gases, this dilution being effected solely by the conversion of the oxygen to carbon monoxide within the charge. For example, by introducing into the upper portion of the retort that amount of commercial grade oxygen alone which would effect the same degree of dilution of the zinc vapor-bearing retort gases as that effected by a given amount of air, the oxygen alone will generate two and one-half times as much heat within the charge as that which would be produced by using atmospheric air. As a practical matter, the amount of heat available for the reduction will be more than two and one-half times that available when using air because none of the heat generated by the reaction between carbon and oxygen alone is used to heat the inert nitrogen which is introduced when air is used.

The concurrent flow of the zinc vapor-bearing gases and the charge in accordance with the invention also leads to beneficial results. With such concurrent flow, the zinc vapor-bearing retort gases are removed from the lower portion of the charge containing residual excess carbon at approximately the highest temperature prevailing therewithin. At this elevated temperature there is virtually no tendency for the carbon monoxide in the retort gases to dissociate with the resulting formation of carbon dioxide. Moreover, virtually all of the zinciferous material is reduced by the time the charge reaches the lower portion of the retort, with the result that there is substantially no zinc oxide in this lower portion of the charge to react with carbon monoxide to produce carbon dioxide. The excess carbon in the spent charge adjacent the point of withdrawal of zinc vapor further precludes the existence therein of carbon dioxide. Thus, conditions are such in the lower portion of the retort charge as to prevent the formation or existence of carbon dioxide, and, accordingly, there is no opportunity for the zinc vapor to become oxidized and form rock oxide in this portion of the retort. The absence of zinc vapor in the uppermost portion of the retort also eliminates the production of rock oxide therein, as distinguished from conventional vertical retort smelting wherein zinc vapors cooled by contact with the relatively cool upper walls of the retort tend to become oxidized by carbon dioxide formed as a result of dissociation of carbon monoxide cooled by similar contact with these walls.

The delivery of zinc vapor-bearing gases from the lower portion of the retort directly to a splash-type condenser is also attended by certain advantages. For example, the retort gases withdrawn from the lower portion of the retort are at a temperature substantially above that at which carbon monoxide dissociates into carbon dioxide, and the carbon monoxide-bearing retort gases are not appreciably cooled before they reach the interior of the splash condenser. Thus, it is possible to cool the retort gases in the splash condenser from this relatively high temperature to a zinc vapor-condensing temperature with such rapidity that there is substantially no opportunity for the carbon monoxide to dissociate into carbon dioxide. Moreover, the splash condenser is capable of effecting rapid condensation of the high temperature zinc vapor directly to molten zinc without producing physical blue powder. Accordingly, the zinc vapors in the retort gases are condensed without the production of any appreciable amount either of blue powder, which results from surface oxidation of droplets of condensed zinc, or of physical blue powder, which results from solidification of unoxidized droplets of condensed zinc before their coalescence into massive molten metal.

An additional advantage which attends the concurrent flow of retort gases and charge downwardly through a vertical retort in accordance with the present invention is the saving of zinc vapor during each charging of the retort. In conventional vertical retort practice, where the zinc vapors are withdrawn from the upper portion of the retort, a substantial amount of zinc vapor escapes through the charge opening when the retort is opened for charging. In the method of the present invention, the flow of retort gases is in the reverse direction through the retort and substantially no zinc vapors are present in the uppermost portion of the retort. Accordingly, when the cap 13 is removed from the charge opening 12 to introduce a fresh charge of agglomerates, there is no substantial escape of zinc vapor through the charge opening.

Although the charge opening in the apparatus used in practicing the invention may be a simple opening closed with a cap 13, or the like, as shown in Figs. 1 and 2, the bell-type charging device shown in Figs. 3 and 4 may be used with advantage. This bell-type charging device comprises two chambers 25 and 26 both having substantially the same width as the wide side of the vertical retort 5. The thickness of the uppermost chamber 25, however, is considerably greater than the narrower side of the retort 5, as shown in Fig. 4, and the lowermost portion of the chamber 25 tapers inwardly to form a tapered throat 27 which communicates with the uppermost end of the lower chamber 26. The lowermost end of the chamber 26 which has a thickness intermediate that of the upper chamber 25 and that of the retort 5, is similarly provided with an inwardly tapered throat 28 communicating with the uppermost end of the retort. The throats 27 and 28 are closed by conically shaped closure members 29 and 30, respectively. The uppermost closure member 29 is provided with an upwardly projecting sleeve 31 through which there extends a shaft 32 connected to the lower closure member 30. By raising the sleeve 31, the upper closure member is raised to permit a charge present in the upper chamber 25 to descend into the lower chamber 26. When the lower chamber 26 is filled with the charge, its closure member 29 is returned to the closed position and the shaft 32 is lifted to raise the lower closure member 30. The charge within the lower chamber 26 is thereupon admitted into the end of the vertical retort 5. This charging device may be used with particular advantage because it maintains a closed condition at the top of the retort at all times and thus tends to prevent the establishment of an upward draft through the retort during the charging operation which would tend to produce an upward flow of zinc vapor into the upper portion of the retort with resulting possible loss of zinc vapor. The loss of zinc in the spent residue may also be prevented by admitting through line 33 a small amount of air sufficient to prevent diffusion of zinc vapor below the level of the zinc vapor outlet 19. The small amount of oxygen in the air introduced into the bottom of the charge is completely converted to carbon monoxide as it rises through the hot spent charge toward the zinc vapor outlet and thus presents no danger of creating an oxidizing condition in the region of the zinc vapor outlet.

It will be seen, accordingly, that my novel method of smelting zinciferous material in a vertical retort leads to more effective smelting and zinc recovery than is possible in conventional vertical retort practice. The amount of air which could be used in such conventional practice has been limited by the danger of fusing the charge where air is introduced into the bottom and hottest portion of the charge. This limitation has also precluded the use of oxygen-enriched air or oxygen alone, both of which would accentuate the development of such local overheating in the lower portion of the charge. Moreover, when air is introduced into the bottom of the charge in conventional vertical retort practice, the oxygen of the air is and must be completely consumed before it reaches the relatively cool charge in the upper portion of the retort from which the zinc vapor is withdrawn. In the method of the present invention, a relatively large amount of air, oxygen-enriched air, or even oxygen alone, is introduced into the fresh charge in the upper portion of the retort where maximum advantage can be taken of the heat generation effected thereby. Moreover, the concurrent flow of retort gases and charge within a vertical retort in accordance with the invention makes possible the substantial elimination of oxidizing conditions in those portions of the retort and its appurtenances wherein recoverable zinc vapor exists. The resulting improvements in heating and zinc recovery thus characterize the method of the present invention and contribute to its increased effectiveness over conventional vertical retort practice.

I claim:

1. In the method of smelting zinc in which an agglomerated charge of mixed zinciferous material and carbonaceous reducing agent preheated to at least 500° C. is progressively passed downwardly through an externally heated vertical retort wherein the charge is heated to a temperature sufficiently high to reduce compounds of zinc therein and to produce metallic zinc vapor, the improvement which comprises admitting an oxygen-bearing gas into the upper portion of the vertical retort and withdrawing zinc vapor-bearing gases from the lower portion of the retort so as to maintain a flow of the gases and vapor concurrently with the charge downwardly through the retort, and condensing the withdrawn zinc vapors in a splash-type condenser wherein the zinc vapor-bearing gases are passed through a shower of molten zinc and the zinc vapor is condensed thereby.

2. The method according to claim 1 wherein the oxygen-bearing gas admitted to the upper portion of the retort consists of oxygen.

3. The method according to claim 1 wherein the zinc vapor-bearing gases withdrawn from the lower portion of the retort are passed directly into the splash-type condenser at substantially the same temperature as that at which the gases are withdrawn from the retort.

4. The method according to claim 1 wherein the oxygen-bearing gas admitted to the upper portion of the retort consists of oxygen, and wherein the zinc vapor-bearing gases withdrawn from the lower portion of the retort are passed directly into the splash-type condenser at substantially the same temperature as that at which the gases are withdrawn from the retort.

WILLIS M. PEIRCE.

No references cited.